United States Patent [19]

Hanaoka

[11] 3,999,383
[45] Dec. 28, 1976

[54] ENGINE MISFIRE PROTECTION SYSTEM
[75] Inventor: Masanori Hanaoka, Toyota, Japan
[73] Assignee: Toyota Jidosha Kogyo Kabushiki Kaisha, Japan
[22] Filed: Aug. 29, 1974
[21] Appl. No.: 501,811

Related U.S. Application Data
[62] Division of Ser. No. 399,610, Sept. 21, 1973, Pat. No. 3,939,711.

[30] Foreign Application Priority Data
Dec. 4, 1972   Japan ............................. 47-120602

[52] U.S. Cl. .................................. 60/277; 60/289
[51] Int. Cl.² ...................................... F02B 75/10
[58] Field of Search ............... 60/277, 289; 73/346, 73/341, 342, 343 R

[56]        References Cited
       UNITED STATES PATENTS
1,489,644   4/1924   Luscombe ........................... 73/346
3,101,617   8/1963   Brinson ............................. 73/346
3,472,068   10/1969  List ................................... 60/277
3,738,108   6/1973   Goto ................................. 60/277

Primary Examiner—Douglas Hart
Attorney, Agent, or Firm—Toren, McGeady and Stanger

[57]    ABSTRACT

In the engine misfire detection system disclosed, a heat responsive device, such as a thermocouple or a thermoresponsive resistor, at the exhaust port of each cylinder of an internal combustion engine exhibits an electromotive force that changes in response to the temperature difference between a normal firing and a misfire. The heat responsive devices are connected in pairs in series opposition and coupled to an electric meter. All the devices are integrally incorporated in an electrically insulated sealing arrangement used when mounting the exhaust manifold to the cylinder head.

1 Claim, 6 Drawing Figures

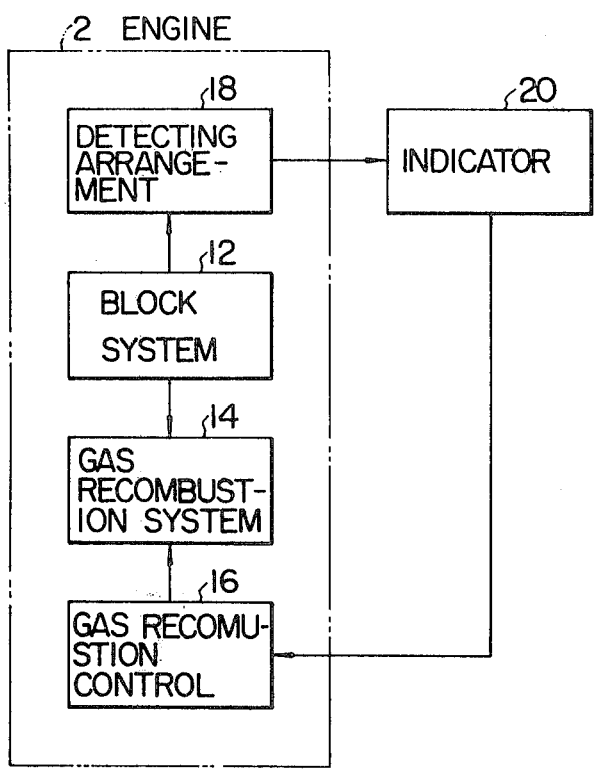

ENGINE MISFIRE PROTECTION SYSTEM

This is a division of application Ser. No. 399,610 filed Sept. 21, 1973, now Patent No. 3,939,711.

BACKGROUND OF THE INVENTION

This invention relates to an engine misfire protection device, and more particularly to a system for electrically detecting misfires in internal combustion engines.

Heretofore, engine misfires have been detected either by determining that the engine is malfunctioning from the abnormal sound of engine operations and examining the effect of removing a plug cord upon engine rotation, or by ascertaining the amount of unburned hydrocarbons in the exhaust system. The latter is accomplished by using one of a number of exhaust gas meters which have been developed in recent years. Unfortunately neither of these methods offers a practical way of detecting misfires when the vehicle is moving. Also, these methods depend greatly on the driver's judgement. Hence, these methods do not make it possible to detect engine misfires quickly and correctly.

Recently, in order to comply with regulations concerning automobile exhaust gases, methods involving oxidation reaction and using reactors, catalytic converters, or other exhaust disposal means in the exhaust system have been proposed for removing or reducing carbon monoxide (CO) and hydrocarbons in exhaust gases. Unfortunately continuous engine misfires would create and release great amounts of unburned components. These would produce violent reactions in the devices or generate high temperature reaction heat which would damage the reactor, or in the worst cases, set fire to the vehicle. Therefore, the vehicles equipped with such exhaust gas cleaning devices require the driver to pay particular attention to engine misfires.

An object of the invention is to improve engines generally.

Another object of the invention is to avoid the aforementioned disadvantages.

Still another object of the invention is to provide means capable of detecting engine misfires quickly and simply even when a vehicle is moving.

SUMMARY OF THE INVENTION

According to a feature of the invention, these objects are obtained, in whole or in part, by mounting a heat-responsive electrically-varying element in each cylinder of an engine and connecting pairs of elements in a balanced relationship to an electrical indicator so that when a difference in temperature between cylinders unbalances the pair the indicator indicates the unbalance electrically.

According to another feature of the invention the elements change their electromotive force or receptivity in response to temperature changes or differences.

The invention is based upon the recognition that the misfire creates an exhaust gas temperature difference amounting to several hundred degrees between a cylinder where normal combustion is taking place and a cylinder where a misfire is taking place. The invention is also based upon the recognition that the misfire is unlikely to take place in two cylinders simultaneously.

These and other features of the invention are pointed out in the claims. Other objects and advantages of the invention will become evident from the following detailed description when read in light of the accompanying drawings.

BRIEF DESCRIPTION OF THE DRAWINGS

FIG. 5 is a gas recombustion control system utilizing the present invention.

DESCRIPTION OF PREFERRED EMBODIMENTS

Figure 1:
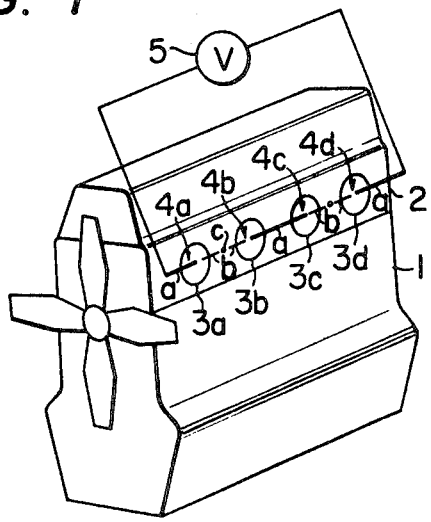
FIG. 1 is a perspective view of an internal combustion engine embodying features of the invention and having an indicating circuit and showing where thermocouples are used as detector elements.

In the embodiment of the present invention illustrated in FIG. 1, detector elements in the form of thermocouples 4a to 4d whose electric properties change in dependence upon temperature differences or changes are located as shown. Specifically, four thermocouples 4a to 4d each capable of measuring the temperature of exhaust gas released from the engine are mounted in respective exhaust ports 3a to 3d in a cylinder head 2 resting on a cylinder block 1.

Each of the thermocouples 4a to 4d is composed of two different types of metallic wires, a and b. The thermocouples 4a and 4b form one pair while the thermocouples 4c and 4d form a second pair. Connections (c) join the same type of metallic wires (b) in each pair. Thus the polarity of the electromotive force produced in one thermocouple 4a or 4c and the polarity of the electromotive force generated in the other thermocouple 4b or 4d will oppose each other. Thus if they are equal they will cancel each other. The other types of metallic wires (a) of the thermocouples 4b and 4c are connected together and all the four thermocouples 4a to 4d are connected in series. A voltmeter 5 is disposed between the metallic wires (a) of the thermocouples 4a and 4d.

Effectively when each of the thermocouples is subjected to the same temperature, the electromotive force generated by thermocouples 4a and 4b and by thermocouples 4c and 4d will cancel each other. Thus no voltage would be produced in the metal 5. If the temperature in the cylinder 3a differs from the temperature in the cylinder 3b while the temperatures of the cylinders 3c and 3d are the same, the electromotive forces produced by the cylinders 4a and 4d will not cancel but will produce a reading in the meter 5.

Figures 2A, 2B:
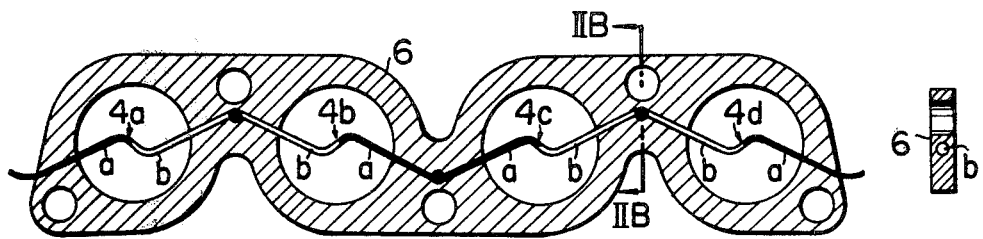
FIG. 2A is a sectional view of the exhaust ports of the engine in FIG. 1 and showing details of the circuit generally illustrated in FIG. 1 and embodying features of the invention.
FIG. 2B is a section along the line IIB-IIB of FIG. 2A.

As shown in FIGS. 2a and 2b the metallic wires (a) and (b) of the respective thermocouples 4a to 4d are embedded in an electrically insulating gasket 6. The latter is sandwiched between the cylinder head 2 and the exhaust manifold when the engine is assembled. Thus all the thermocouples are integrally incorporated in the assembly.

When the engine operates normally with no misfires, combustion in the cylinders produces substantially no difference in temperature among the exhaust gases discharged from the respective exhaust ports 3a to 3d. Thus the electromotive forces produced in every pair of thermocouples 4a and 4b, and 4c and 4d, located in the corresponding exhaust ports 3a and 3b, and 3c and 3d cancel. Thus the resultant electromotive force is zero. Hence the voltmeter 5 reads zero.

In case of a misfire, such as in the cylinder feeding the exhaust port 3a, the temperature of exhaust gases emerging from the exhaust port 3a drops below the normal level. The electromotive force of the thermocouple 4b paired with the thermocouple 4a in the particular exhaust port 3a is not balanced. The value of the residual voltage is thus expressed in the voltmeter 5.

This indicates that a misfire has occured.

Generally, the order of explosion in the respective gas cylinders is predetermined. Therefore lags occur in the temperature measurements of the four thermocouples 4a to 4d. However these lags are extremely small in time. Thus they do not appreciably affect the method of operation described.

According to another embodiment of the invention the effect of these lags is more precisely obviated and misfire detection is performed precisely for every cycle, by using suitable operating means such as a timing circuit, memory circuit, or resetting circuit. For example, the voltage generated by one thermocouple is stored in a memory until the other thermocouple of the pair responds to combustion exhaust gases and the comparison is made between them at that time.

Figure 3:
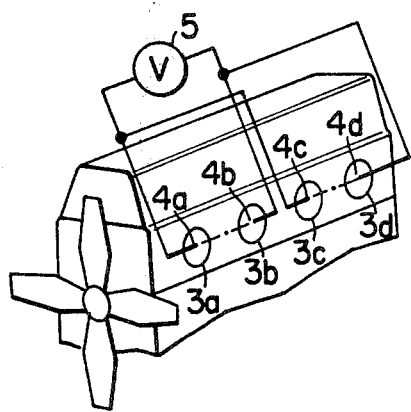
FIG. 3 is a perspective view of a portion of an internal combustion engine and a schematic illustration of another circuit embodying features of the invention also used with the engine.

FIG. 3 show another embodiment of the present invention. Here the same thermocouples 4a to 4d as described for FIGS. 1 and 2 are used. However here, the paired thermocouples 4a and 4b, and 4c and 4d, are connected in parallel to the voltmeter 5. This arrangement permits detection of misfires in the same way as in the preceding embodiment.

Figure 4:
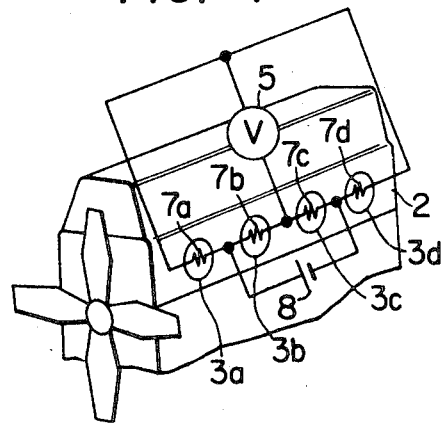
FIG. 4 is a partly schematic view of an engine and a schematic view of a circuit also embodying features of the invention, wherein thermistors are employed as detector elements in contrast to thermocouples of FIG. 3.

FIG. 4 illustrates still another embodiment of the present invention. Here, thermistors or platinum wires are used as detector elements. The electrical properties of the elements are varied in response to changes in temperature or temperature differences. In this embodiment, four thermistors 7a to 7b are provided in the respective exhaust ports 3a to 3d in the same way as FIGS. 1, 2 and 3 so as to be able to measure respective temperatures. The thermistors 7a to 7d form a bridge. A voltage source in the form of a battery 8 energizes the bridge at opposite points while a voltmeter 5 measures the balance of the bridge.

When the engine operates normally, free of misfires, exhaust gases from the respective exhaust ports exhibit substantially the same temperature. This keeps the resistivities or resistances of the four thermistors 7a to 7d at substantially the same value. Therefore, the potential between the thermistors 7c and 7d remains equal to the potential between the thermistors 7a and 7b. Thus the needle of the voltmeter points to zero. If a misfire occurs in one of the cylinders, the temperature of the gases in one of the exhaust ports differs from the temperature in others of the exhaust ports. Accordingly, the resistivity or resistance of one of the thermistors changes. This unbalances the bridge and deflects the needle of the voltmeter 5 due to the voltage difference between both ends of the volt meter. This indicates the occurence of the misfire. As in the previous embodiments, the thermistors 7a to 7d are mounted in a gasket, spacer, or other suitable locations.

The foregoing embodiments are described for a four cylinder engine. According to other embodiments of the invention the systems of FIGS. 1 to 4 are used in six cylinder, eight cylinder, or other types of engines. According to other embodiments of the invention, other electric indicators or alarms are substituted for the voltmeter 5.

The embodiments described operate on the principle that misfires occur in one cylinder at a time. Although very rare, it is not impossible or even improbable for misfires to take place in two cylinders simultaneously. If the simultaneous misfires occur in the right cylinders, the balance of the system may be maintained despite the misfires and the indicators or alarms would not be able to distinguish the operation from that of the normal state. However, if misfires should occur in two or more cylinders at the same time, the driver can easily ascertain this from the abnormal operating condition of the engine. Thus alarms or other protective means for the types of misoperations which result in simultaneous misfiring in two cylinders are not necessarily needed.

The present invention makes it possible to quickly and correctly detect misfiring in the engine with an electrical indication or alarm. It also makes it possible for the engine to recover its normal operating condition and to prevent trouble in the exhaust gas purifying or cleaning device.

According to another embodiment of the invention, a misfire signal by an indicator corresponding to the voltmeters 5 of the present invention interrupts the supply of secondary air used for recombustion of exhaust gases.

According to another feature of the invention, the voltmeter 5 or other indicating instrument is set to indicate a misfire on the basis of exhaust gas temperature differences between normal combustion cylinders and a misfiring cylinder, not only of differences of very high value which indicate total misfires, but also to lower values which indicate partial misfire.

The invention provides simple means for obtaining misfire indications without need of separately extracting the exhaust gas temperatures in the respective cylinders. This results in a wholly simplified system. Moreover, because part of the component elements of the present invention are integrally incorporated in engine part such as a gasket, the reliability, durability, and adaptability of the device is greatly improved.

FIG. 5 is a block diagram of a system embodying features of the invention and utilizing the output of an indicator corresponding to the voltmeter 5 to control the gas recombustion system on the basis of the output of the detecting arrangement. Here the engine 2 includes the block system 12 composed of the block 1 and head 2. A gas recombustion system 14 in the form of a catalytic converter or other exhaust disposal means purifies the gas exhaust from the block system 12. A gas recombustion control 16 controls the operation of the gas recombustion system 14 by varying the operating temperature or the entrance of secondary air or both. A detecting arrangement 18 corresponds to the detecting arrangement composed of elements 4a to 4d of FIGS. 1 to 3 or elements 7a to 7d and 8 in FIG. 4. An indicator 20 connected in lieu of or in addition to the voltmeter 5 produces signals corresponding to those indicated by the voltmeter 5. The gas recombustion control 16 responds to the indicator 20 to control the gas recombustion system 14 in response to misfiring detected by the detecting arrangement 18.

While embodiments of the invention have been described in detail, it will be obvious to those skilled in the art that the invention may be embodied otherwise without departing from its spirit and scope.

What is claimed is:

1. A drive apparatus for a vehicle, comprising an engine having an engine block forming a plurality of cylinders, said block forming gas exhaust ports for said cylinders, said engine including manifold means mounted on said block, said engine including a sealing member sealing said manifold means to said block near said exhaust ports, a plurality of temperature-responsive electrical means each mounted in the exhaust ports and each having responsive variable electrical characteristics for changing their electrical characteristics in response to the temperatures at the gas exhaust ports, circuit means connecting said electrical means for comparing the electrical characteristic of one with the electrical characteristics of another at any one time, and for producing a balance when the two electrical means are subject to the same temperatures and for producing an unbalance when the electrical means are subject to two different temperatures and indicator means coupled to said circuit means or indicating the condition of balance, said electrical means being mounted in said sealing member, and said engine including gas recombustion means coupled to said manifold means and control means in said gas recombustion means responsive to said indicating means for varying the operation of said gas recombustion means in response to indications of said indicating means.

* * * * *